United States Patent Office

3,013,086
Patented Dec. 12, 1961

3,013,086
BLOCKED PHENOL REACTION PRODUCTS
David W. Young, Westfield, and Delmer L. Cottle, Highland Park, N.J., assignors to Esso Research and Engineering Company, a corporation of Delaware
No Drawing. Filed July 30, 1954, Ser. No. 446,978
3 Claims. (Cl. 260—613)

The present invention relates to the preparation of a novel and useful class of compounds from substituted phenols. More particularly, the present invention relates to the preparation of ether-alcohols from phenols substituted in both ortho and para positions, or so-called "blocked" phenols. Still more particularly, the present invention relates to novel surface active compounds having high utility as wetting agents prepared by the reaction of blocked phenols with olefin oxides.

It has long been recognized that certain phenols, particularly those substituted by aryl and alkyl groups in the 2, 4, and 6 positions, do not undergo the usual phenol reactions. These blocked phenols, or "hindered phenols" as they are sometimes called, are not soluble in aqueous or alcoholic alkali, do not react with sodium carbonate, do not undergo the diazotization coupling reaction, and in general are quite inert to the reagents generally specific for phenols. Such compounds have in the past been generally considered as unsuitable as intermediates in the synthesis of useful organic compounds. Thus in an article entitled "The Hindered Phenols" by Stillson, Sawyer and Hunt, appearing in 67 J.A.C.S. 303 (February 1945) it is pointed out that the 2, 4, 6 trisubstituted phenols, particularly those containing at least one tertiary butyl or other large hydrocarbon groups in the two positions ortho to the hydroxyl group do not respond to conventional tests and reactions of phenols. Even metallic sodium will not react with the phenol dissolved in an inert solvent, but will only do so when dissolved in liquid ammonia. That and the reaction with a Grignard reagent to liberate methane were the only two reactions to which this type of phenol was found amenable.

Surprisingly, it has now been found that these hindered phenols react with ethylene oxide to give good yields of ether alcohols having excellent capillary and wetting agent activity. Because hitherto it has not been found possible to react blocked phenols through the hydroxyl group, this represents a novel reaction; and a novel as well as useful class of compounds has become available. The reaction is restricted to ethylene oxide; propylene oxide will not react.

In accordance with the present invention, therefore, phenols having both ortho positions and the para position blocked by alkyl, aryl, arylalkyl, hydroxyarylalkyl, alkylhydroxyarylalkyl and similar groups, at least one of the substituents in the ortho position being a tertiary alkyl group, are reacted with 1 to 20 mols of ethylene oxide, and preferably in the added presence of a solvent. Suitable are aromatic hydrocarbons such as toluene, xylene and the like. An excellent catalyst for the process are the alkalis, such as sodium hydroxide and potassium hydroxide. Suitable reaction conditions are pressures of 200 to 4,000 p.s.i.g. and temperatures of 125 to 300° C.

As examples of blocked phenols that may be employed in this reaction, there may be considered the methyl, propyl and butyl, e.g. 2,6-ditertiary-butyl-4-methyl phenol and 2,4,6-tri-tertiary butyl phenol.

The present invention may be further illustrated by the following specific examples.

Example I 12.5 g. of 2, 6, ditertiary butyl-4-methyl phenol were reacted with 12.5 grams of ethylene oxide at 225–250° C. in the presence of 100 ml. of xylene. At the end of a few hours, the product was heated under vacuum to remove solvent and unreacted phenol. The final product had a carbon content of 59.80% and hydrogen content of 9.80%, indicating the addition of 20 mols ethylene oxide per mol of phenol. The product was water-soluble.

Example II

In another experiment, 25 grams of the above phenol was reacted with 25 grams of ethylene oxide, 1 gram of sodium hydroxide and 50 grams of toluene. The final product on work up had a molecular weight of 620.

The characteristics of the novel composition as wetting agents were determined by the method of Draves and Clarkson as published in the "Proc. Am. Assoc. Textile Chem. Colorists" (1931), 109. The Draves' test gave the following result:

| Moles Phenol in Condensate | Moles Ethylene Oxide | Concen. in $H_2O$, percent | Time for kst. (secs.) |
|---|---|---|---|
| 1 mol 2,6 ditertiary butyl 4 methyl phenol | 2 | 0.5 | 24 secs. |
| Do | 3 | 0.5 | 11. |
| Distilled water (Blank) | | | >4 hours. |

From the above data it is apparent that the polyether alcohols promote the wetting of a fabric in water. Even better wetting properties are obtainable when higher proportions of ethylene oxide is employed in the condensation.

The products of the present invention may also find application as intermediates in the manufacture of synthetic lubricants, detergents, greases, resins, sludge dispersers for oils, soil additives and the like.

What is claimed is:

1. A process for preparing ether alcohols from hindered phenols which comprises reacting a hindered phenol having tertiary butyl substituents in the 2 and 6 positions and a $C_1$ to $C_4$ alkyl substituent in the 4 position, with 1–20 moles of ethylene oxide at elevated temperatures of from about 125° to 300° C. and pressures of from about 200 to 4000 p.s.i.g. and recovering the corresponding oxethylated compound.

2. The process of claim 1 wherein said reaction is catalyzed with minor amounts of alkaline reacting material.

3. The process of claim 1 wherein said phenol is 2,6-ditertiary-butyl-4-methyl-phenol.

References Cited in the file of this patent
UNITED STATES PATENTS

| | | |
|---|---|---|
| 2,213,477 | Steindorff et al. | Sept. 3, 1940 |
| 2,430,002 | De Groote et al. | Nov. 4, 1947 |
| 2,593,112 | Cross et al. | Apr. 15, 1952 |
| 2,745,882 | Hale | May 15, 1956 |

OTHER REFERENCES

Stillson et al.: Jour. Amer. Chem. Soc., vol. 67 (1945), pages 303–307.

Schwartz et al.: Surface Active Agents (1949), pages 18, 202, 203.